July 9, 1935.  L. W. McANALLEN  2,007,455
SECTIONAL MUD CONVEYING TROUGH
Filed July 5, 1933
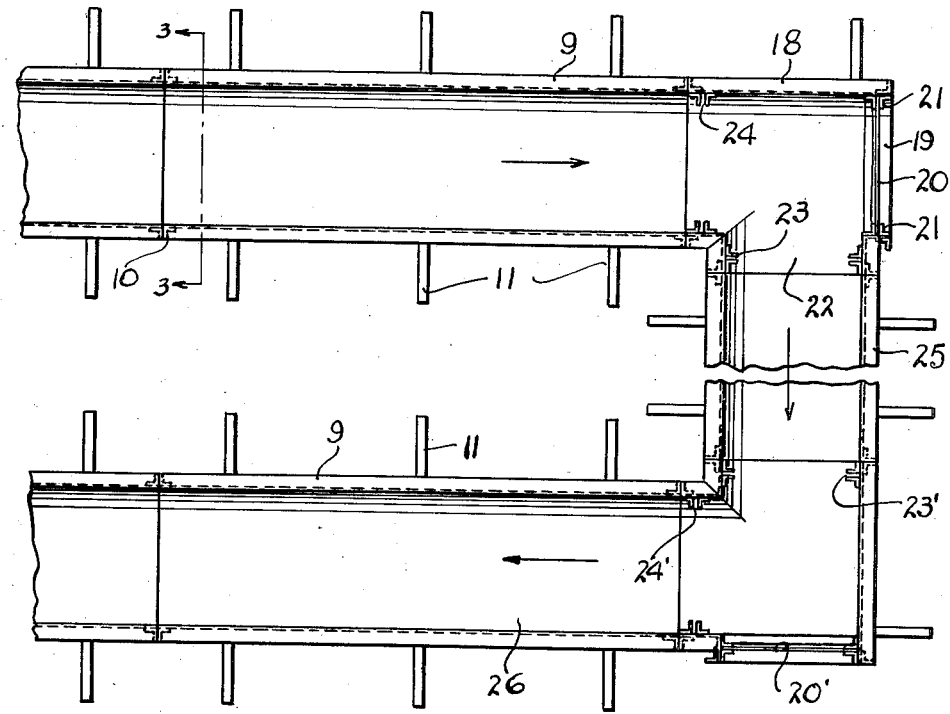
Fig.1.
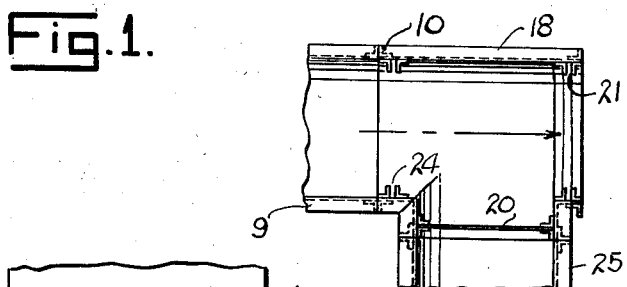
Fig.4.
Fig.3.
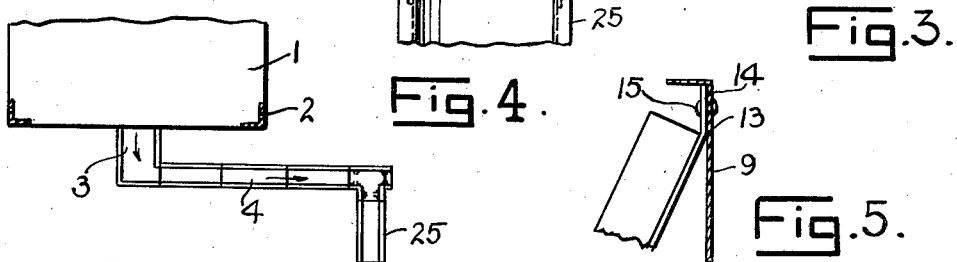
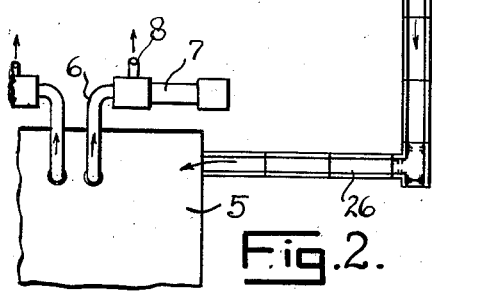
Fig.2.
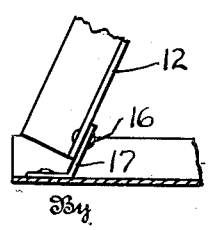
Fig.5.
Leo W. Mc.Anallen Inventor
Jesse R. Stone
Lester B. Clark
By
Attorneys Patented July 9, 1935

2,007,455

UNITED STATES PATENT OFFICE 2,007,455

SECTIONAL MUD CONVEYING TROUGH

Leo W. McAnallen, Dayton, Tex., assignor to Chas. W. Fisher

Application July 5, 1933, Serial No. 679,072

4 Claims. (Cl. 209—458).

My invention relates to the construction of a trough for conveying mud in well drilling operations.

In the present system of drilling by the rotary method, it is customary to pump a prepared mud into the well to act to cool the bit and carry away in suspension the cuttings from the drill. This mud also has various other purposes, one of which is to penetrate and mud-up the wall of the hole so that it will not cave in during the process of drilling. The mud as it issues from the well passes through a trough to the settling pit or sump. It carries with it the cuttings from the well and these cuttings may be rock or shale or clay and other materials which tend to settle out rapidly during their passage through the trough which conveys the mud from the well to the pit or sump.

The trough which is usually employed is ordinarily made of wood and has to be specially constructed for each installation. It is made up of heavy boards or planks rigidly nailed together at an expenditure of time and material and after the well has been drilled it is practically impossible to salvage any material part of the trough. Further than this, it is necessary to clean the settlings from the trough on an average of about three times a day. To do this, the helpers about the rig have to wade into the mud and with a shovel clean out the settlings from the bottom of the trough and throw them to one side. This is laborious and time-consuming job and disagreeable to the driller. Furthermore, the settlings from the trough are thrown at a point closely adjacent the pit and are in the way of other operations about the well.

It is an object of the invention to provide a portable trough which may be made in sections and easily erected and transferred from one installation to another.

I desire to construct a trough of sheet metal which is provided with a base which may be placed in position and easily connected with other sections or portions of the trough to make up any desired length or shape of conveying trough.

It is another object of the invention to provide means in connection with the trough whereby it may be easily cleaned of settlings by flushing out different portions of the trough consecutively.

I further desire to provide a trough in which the course of the mud therethrough may be easily changed from one direction to another where desirable.

The invention also consists in the particular construction of the units making up the completed trough which may be interchangeable to adapt it for the use above set forth.

In the drawing herewith, Fig. 1 is a broken top plan view of a portion of the trough constituting the subject of this invention.

Fig. 2 is a broken assembly view showing the complete trough and the route through which the mud is conducted from the well to the sump.

Fig. 3 is an end view of one of the units or sections of my invention taken approximately on the plane 3—3 of Fig. 1.

Fig. 4 is a broken detail of one of the elbows which may be employed in the trough.

Fig. 5 is a broken transverse section somewhat enlarged through one of the trough sections showing the manner in which the same may be braced.

In Fig. 2 I have shown a derrick platform 1 at the corner of which are the usual derrick legs 2. The mud which is circulated downwardly through the drill stem into the well is to be understood as rising up around the drill stem and within the casing and discharging laterally through the outlet 3. I desire to connect up with this outlet my mud conveying trough 4, which conducts the stream of mud around into the sump or settling pit 5. From this pit the mud is picked up by the inlet end 6 of a pump shown diagrammatically at 7, by means of which it is forced back through the hose 8 to the swivel at the top end of the drill stem.

My invention lies particularly in the construction of the trough 4. This trough is made up of sections 9 which are U-shape in cross section, as shown at 3. The wall of the trough is made up of sheet metal of sufficient thickness, bent into the U-shape shown, and provided at the end of said section with laterally extending flanges 10. These flanges are formed by U-shaped sections of angle iron, one face of which is connected to the side wall of the trough and the other face of which is directed outwardly away from the trough and adapted to contact with a similar portion of angle iron on the adjacent section and thus serve as a means for securing adjacent sections together, either by bolting or other desirable means.

Each section 9 of the trough is erected on a base so that it may be easily mounted in position when desired. I prefer to form this base of a transverse section of angle iron 11, which projects from each side of the trough, as shown in Fig. 3, I contemplate the use of approximately three of these transverse base members on each of the units or sections. This base member is secured to the lower wall of the trough and is reenforced by an inclined brace member 12, which is also preferably made of angle iron. The brace 12 is connected with the side wall of the section 9, as best shown in Fig. 5. I contemplate cutting away one web of the angle iron for a short distance and bending the other one at a slight inclination, as shown at 13, so as to brace the extending web 14 parallel with the side wall of the trough. This extending end is riveted or bolted at 15 to the trough. The lower end of the brace member 12 may be secured to the base member 11 by welding or by bolting the same at 16 to a bracket 17 connected to the base member. When thus constructed each of these units may be moved from place to place and supported upon the base members 11 as will be easily understood.

In the curves in the trough, which are desirable, I form at the corners of each turn or curve in the trough an elbow or L member 18. This L member has one end 19 formed with a removable end wall 20. To accommodate this wall, which is slidable vertically to and from position, I form slideways 21 at each side of the open end 19. This slideway is formed by two sections of angle iron spaced apart the proper distance and secured to the inner wall of the trough. On the other open end 22 of the L, I provide another slideway 23, into which the removable gate or wall 20 may be inserted. It is thus possible to remove the wall or gate 20 from its normal position and place it within the slideway 23, thus closing off the flow of mud through its usual channels and allowing an open portion 19. This allows the operator, when desired, to flush out the portion of the trough adjacent the well of settlings therefrom. It is understood that the pump which handles the fluid may be disconnected from the source of mud supply and used to pump water into the trough and wash the mud therefrom. As these pumps are powerful pumps a stream of flushing water may be employed to quickly wash out the settlings from the trough through the open end 19 and carry it away from the well. When one section has thus been cleaned out, the gate or wall 20 may be inserted into another slideway 24 at the entrance side of the L and a similar gate 20' at the next turn in the trough may be opened and inserted in the adjacent slideway 24', so that the portion of the trough indicated at 25 may be flushed free of any mud settling therein. When this has been done the gate 20' may be inserted in the slideway 23' and the section indicated at 26 may be flushed. It is thus possible to clean the settlings from the trough efficiently and expeditiously and these settlings may be carried by the stream of flushing water away from the rig so that they will not be in the way during subsequent operations about the trough.

One particular advantage of my invention lies in the fact that the same trough may be used repeatedly and is easily portable from one well to another and may be easily assembled into position making up the trough; and it is obvious that the length and particular shape of the trough may be varied by the use of a larger or smaller number of units and L's. Not only is the trough portable but it is particularly adapted for ready cleaning of the settlings therefrom. It is thus not only economical and convenient to the driller but adapts itself to a saving of time and labor in the drilling operations.

What I claim as new is:

1. An angularly arranged mud conveying trough made up of sections of sheet metal of U-shape in cross section, means to connect said sections together, elbows at the angles of said trough having two open ends to be connected in said trough, the sides being closed, one of the closed sides of said elbows being removable to form a gate, means at said open ends to receive said gate to close off a portion of said trough and permit a section of said trough to be flushed in the manner stated.

2. A mud-circulating sluiceway made up of U-shaped trough sections of sheet metal, means to hold said sections in operative position, elbows of sheet metal adapted to be connected to said sections to form bends in said sluiceway, said elbows having two open ends for connection to adjacent trough sections, a removable gate closing one of the sides of said elbow, and slideways at said open ends to receive said gate.

3. A mud circulating sluiceway made up of U-shaped trough sections of sheet metal, elbows of sheet metal adapted to be connected to said sections to form angular bends in said sluiceway, said elbows having two open ends for connection to adjacent trough sections, a slidably removable gate closing one of the sides of said elbow, and slideways at said open ends to receive said gate and close off a portion of said sluiceway.

4. A mud-circulating sluiceway including U-shaped trough sections of sheet metal, marginal flanges at the ends of said sections to engage with similar flanges on the ends of adjacent sections, means for connecting said flanges, elbows of sheet metal adapted to be connected to said sections to form an angular sluiceway, said elbows having two open ends for connection to adjacent trough sections, a removable gate closing one of the sides of said elbow, and slideways at said open ends to receive said gate.

LEO W. McANALLEN.